(12) United States Patent
Courage et al.

(10) Patent No.: US 6,503,319 B1
(45) Date of Patent: *Jan. 7, 2003

(54) METHOD FOR PREPARING A MORTAR

(75) Inventors: Antonius J. F. M. Courage, Stein (NL); Joseph P. Friederichs, Thorn (NL)

(73) Assignee: DSM N.V., Heerlen (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,469

(22) Filed: Aug. 7, 1998

Related U.S. Application Data

(63) Continuation of application No. PCT/NL97/00059, filed on Feb. 13, 1997.

(30) Foreign Application Priority Data

Feb. 14, 1996 (NL) ............................................. 1002344

(51) Int. Cl.$^7$ ............................................. C04B 18/14
(52) U.S. Cl. ...................... 106/737; 106/738; 106/753; 106/754; 106/DIG. 7
(58) Field of Search ................................ 106/737, 738, 106/753, 754, DIG. 7

(56) References Cited

U.S. PATENT DOCUMENTS

| | | | | |
|---|---|---|---|---|
| 4,345,944 A | * | 8/1982 | Kazama et al. | |
| 4,946,505 A | * | 8/1990 | Jungk | 106/712 |
| 5,215,584 A | * | 6/1993 | Buxbaum et al. | 106/436 |
| 5,454,867 A | * | 10/1995 | Brothers | |
| 5,769,936 A | * | 6/1998 | Mori | 106/405 |
| 5,853,476 A | * | 12/1998 | Will | 106/712 |
| 5,882,395 A | * | 3/1999 | Linde et al. | 106/460 |
| 6,068,696 A | * | 5/2000 | Anttila et al. | 106/726 |

FOREIGN PATENT DOCUMENTS

| | | | |
|---|---|---|---|
| AT | 381696 | * | 11/1986 |
| AU | A-22130/83 | | 6/1984 |
| BE | 866006 | * | 7/1978 |
| CZ | 222754 | * | 2/1984 |
| DE | 2051755 | * | 6/1972 |
| DE | 2412919 | * | 10/1975 |
| DE | 3538170 | * | 4/1987 |
| DE | 4006068 | * | 1/1990 |
| DE | 4426888 | * | 2/1996 |
| EP | 111 807 | * | 6/1984 |
| EP | 0 111 807 A1 | | 6/1984 |
| EP | 242334 | * | 10/1987 |
| EP | 409751 | * | 1/1991 |
| EP | 0 409 751 B1 | | 1/1991 |
| EP | 0 587 383 A1 | | 3/1994 |
| EP | 587 383 | * | 3/1994 |
| FR | 2751956 | * | 2/1998 |
| JP | A 05100481 | | 10/1991 |
| JP | 05100481 | * | 10/1991 |
| JP | A 06240040 | | 2/1993 |
| JP | 06240040 | * | 2/1993 |
| JP | 10296207 | * | 11/1998 |
| PL | 131483 | * | 3/1982 |
| RU | 2073695 | * | 2/1997 |

OTHER PUBLICATIONS

"Ferrochromium fly ash used as a Pigment in Ceramic Glaze" Ay et al Cer Eng Dept Anadolu Univ Eskisehir Turkey Am Cer Soc Bull (1994), 73(12), p 47–48.*

* cited by examiner

*Primary Examiner*—Paul Marcantoni
(74) *Attorney, Agent, or Firm*—Pillsbury Winthrop LLP

(57) ABSTRACT

Method for preparing a concrete mortar which contains a fraction of inorganic grains having a diameter <500 μm, wherein the fraction containing the inorganic grains is added in the form of a granular material which contains the inorganic grains which, with the aid of a water-soluble polymer, are bound so as to form the granular material. As a result, a homogeneous mortar is obtained.

15 Claims, No Drawings

METHOD FOR PREPARING A MORTAR

This is a Continuation of: International Appln. No. PCT/NL97/00059 filed Feb. 13, 1997 which designated the U.S.

The invention relates to a method for preparing a mortar which contains a fraction of inorganic grains having a diameter <500 μm.

The term mortar refers to a mixture which contains a binder, a filler, preferably sand, and water.

There is a need for admixing mortar, for example concrete mortar, with a fraction of inorganic grains having a diameter <500 μm, hereinafter referred to as fine fraction. As a result the total filler content of the product which is prepared from the mortar, such as, for example, concrete or sand-lime brick can increase, and the mechanical properties of the product are improved. This also makes it possible for a smaller amount of binder such as, for example, cement, to be added to the mortar, while the product which is formed from the mortar still has adequately good mechanical properties.

A problem in the preparation of such a mortar is that the fine fraction, which is generally added separately from the other fillers, mixes only very slowly and often incompletely with other components of the mortar. Consequently the advantages which could be achieved by the addition of the fine fraction are not or only partially achieved. Thus it is then again often necessary to add an excess of binder to the mortar, the drawbacks being that the product prepared from the mortar is less durable, suffers from increased shrinkage and has a higher cost price.

Solutions to the above-mentioned problem have been sought in the past, without a solution having been found with which the desired result was achieved.

It is an object of the present invention to provide a method for preparing a mortar which does not have the abovementioned drawbacks.

This object is achieved, surprisingly, by the fine fraction, in the method according to the invention, being added in-the form of a granular material which contains the inorganic grains fraction, which grains, with the aid of a water-soluble polymer, are bound so as to form the granular material.

This ensures that the fine fraction is mixed rapidly and well, so that a homogeneous mortar is obtained.

A further advantage is that the granular material can be readily handled, whereas the fine fraction as such, for example fine sand, is virtually impossible to handle. When transferred, the fine sand will dust and thus presents a health hazard. Moreover, the fine sand is very cohesive and therefore agglomerates and causes bridging in the hopper of a storage vessel, whereupon the sand is unable to flow through the hopper. The granular material in contrast can be readily handled, does not dust and easily flows through a hopper. Furthermore, the mortar which contains the fine fraction of the inorganic grains can be prepared in a simple manner with the aid of the methods and equipment known therefor, because the water-soluble polymer which binds the grains so as to form the granular material dissolves in the water of the mortar.

EP-A-0 587 383 is describing aglomerates of cement particles. The cohesion of the particles in the agglomerates is insufficient. Further EP-A-0 587 383 does not disclose nor suggest to use a granulate comprising a fine filer fraction to obtain the improved mortar of the present invention.

Examples of suitable material of which the inorganic grains may consist are silicon oxide-containing and calcium carbonate-containing materials such as, for example, fly ash, quartz, blast furnace slags, limestone and sand. Preference is given to the use of sand or limestone.

Examples of water-soluble polymers which can be used are poly(vinyl alcohol), poly(acrylic acid), poly(methacrylic acid), poly(vinyl acetate), copolymers containing monomer units of vinyl alcohol, acrylic acid, maleic anhydride and vinyl acetate cellulose, and also salts of the above-mentioned polymers and copolymers.

Preferably, the grains of the fine fraction have a diameter <250 μm, more preferably <130 μm.

As a result the granular material is, for example, very suitable for use in the preparation of concrete which has a high compression strength and low water penetration.

A granular material employed in the method according to the invention preferably disintegrates very rapidly in water. Were the granular material to retain its consistency over a very long period during the preparation process of the concrete mortar, after the granular material has been added and been blended into the mixture of water and other components, this would unnecessarily delay the preparation process. Preferably, the granular material disintegrates within 600 seconds in water of 23° C., more preferably within 300 seconds, even more preferably within 60 seconds.

Even more preferably, a granular material used in the method according to the invention disintegrates so quickly in water that the granular material is first mixed completely and homogeneously through the mortar, before the granular material disintegrates. As a result, a highly homogeneous mortar is obtained which contains no agglomerates of the fine fraction or only very few of them. Additionally, this provides a very rapid mixing process.

The speed with which the granular material disintegrates can be influenced, for example, by the choice of the water-soluble polymer, the diameter of the granular material and the amount of water-soluble polymer contained in the granular material, based on the fine fraction of inorganic grains.

Very good results are obtained if the granular material has still not disintegrated after 2 seconds, more preferably after 5 seconds, even more preferably after 10 seconds in water of 23° C. The time after which the granular material has disintegrated in water is determined by 95 grams of water at 23° C. in a glass beaker having a volume of 250 ml and a diameter of 66 mm being stirred with a cylindrical magnetic stirrer having a diameter of 8 mm and a length of 40 mm, the stirrer speed being 625 revolutions per minute, 5 grams of the granular material being added to the water and the time then being determined at which the granular material has completely disintegrated.

Preference is given to the use, in the method according to the invention, of a granular material which has a strength of at least 30 N, preferably at least 40 N, even more preferably at least 50 N. Since such a granular material readily withstands forces which, for example, are exerted on the granular material during storage, transportation and during the addition, it is ensured that the granular material in the process retains its consistency well and does not suffer from crumbling or attrition, which again may give rise to the problems which manifest themselves during the use of a fine fraction which is not in the form of the granular material.

The strength of the granular material is determined by a granule being positioned between two parallel planar plates, the plates being moved towards one another in the direction perpendicular to the plates until the granule yields, the force being measured which has to be exerted on the plates, this being carried out for 10 grains from the granular material composition, and the average of the 10 measured forces being calculated.

Preference is given to the use, in the method according to the invention, of a granular material in which the water-soluble polymer used is the salt of a polymer which contains monomer units of styrene and of maleic anhydride (SMA polymer). Such a granular material has a beneficial dissolution rate and good strength. Preference is given to the use of the sodium salt or potassium salt of the SMA polymer. The salt of the SMA polymer can be prepared in a simple manner by the polymer, preferably as a powder, being combined, for example at a temperature of 20–150° C. and a pressure of 1–10 bar, with a solution of sodium hydroxide or potassium hydroxide and the mixture thus obtained then being stirred until the polymer in the form of the salt has dissolved.

The SMA polymer can be prepared with the aid of one of the known methods as described, for example, in Hanson and Zimmerman, Ind. Eng. Chem. Vol. 49, No. 11 (1957), pp. 1803–1807.

The SMA polymer contains, for example, 10–50 mol % of maleic anhydride monomer units. Preferably the SMA copolymer contains 15–50 mol %, even more preferably 20–45 mol % of maleic anhydride monomer units. In addition to monomer units of styrene and maleic anhydride, the SMA polymer may contain monomer units of, for example, acrylic acid, methacrylic acid, an ester of these acids, acrylonitrile, α-methylstyrene, etc. By virtue of the presence of the acrylic acids, particularly if the maleic anhydride monomer units content is relatively low, the water-solubility of SMA polymer and the salt of the SMA polymer is improved yet further.

The intrinsic viscosity of the SMA polymer is, for example, 0.2–0.8 dl/g. Preferably, the intrinsic viscosity is 0.3–0.6 dl/g, because a solution can be made therefrom which is very suitable for use in the preparation of the granular material. Thus a solution having a relatively high concentration of the SMA polymer can be prepared which still has a sufficiently low viscosity.

Preferably, the SMA polymer comprises 20–50 mol % of maleic anhydride monomer units and 80–50 mol % of styrene monomer units, and the intrinsic viscosity is 0.3–0.6 dl/g. The granular material can be prepared by the inorganic grains being mixed with a solution of the water-soluble polymer in water, for example in a mixing ratio of 1–4.5 parts by weight of water-soluble polymer, 10–30 parts by weight of water and 100 parts by weight of inorganic grains, the mixture thus obtained then being dried, for example by the mixture being heated to a temperature of 60–90° C. in an oven, and the dry mixture being ground to produce the granular material. Preferably, the mixture is dried in a rotary oven or on a granulating disc, the granular material being formed directly during drying.

Preferably, the granular material is prepared by coarse sand being ground to fine sand which is then employed for implementing the above-mentioned method. This has the advantages that, after grinding, only a small number of operations need be carried out involving the fine sand as such, and the fine sand need not be extracted from the environment with the aid of complicated techniques. Yet another advantage is that it is thus possible to obtain a very pure fine fraction. The granular material can have various shapes and sizes. Preferably, the granular material has a weight average grain diameter of 1–30 mm, more preferably 2–10 mm. Preferably, the granules are monodisperse, so that the grains disintegrate at the same rate.

The granular material according to the invention can in general be used in any known concrete mortar.

Good results are achieved if 1 $m^3$ of mortar is admixed with 20–450 kg of the granular material.

Additionally, the mortar may contain the other components customary for mortars, such as, for example, cement or unslaked lime as a binder, coarse sand having a diameter up to 2 mm, and particles having a diameter greater than 2 mm, such as, for example, gravel, grains of limestone and of granite. The mortar may also contain aids. Aids are substances which affect the processing characteristics of the mortar and/or properties of the product prepared from the mortar. Examples of aids are accelerator, retardant, plasticizer, colorants and the like.

Examples of mortars are concrete mortar, masonry mortar, mortar for repairs, mortar for the preparation of sand-lime brick, bentonite mortar, plaster mortar, pointing mortar, lime mortar.

The composition and the preparation of concrete mortar is described, for example, in Fibre reinforced cements and concretes (1989), ISBN 1-85166-415-7 and Structurally chemically stable polymer concretes (1971), ISBN 0-7065-1137-9.

The proportioning sequence, the mixing equipment and the other conditions in the preparation of the mortar are known to those skilled in the art and depend, for example, on the type of mortar.

The mortar can be prepared, for example, by water with or without one or more of the other components of the mortar being introduced into a mixer and being mixed, the granules then being added and the mix being further mixed until the water-soluble polymer has dissolved and the fine fraction is dispersed homogeneously throughout the mix, and the other components of the mortar then, if appropriate, being added to the mix.

It is also possible for the dry components of the mortar and the granular material to be premixed in the mixer and the water to be added afterwards. The invention also relates to the granular material which is employed in the preparation of the mortar according to the invention.

Preferably the granular material in addition to the fine fraction contains one or more of the aids. Thus it is no longer necessary for the aids to be apportioned separately.

It is possible for the granular material, in addition to the inorganic grains of the fine fraction, also to contain other inorganic grains, although this is not preferred. Thus it is possible, in the course of the preparation of the fine fraction, for example by grinding coarse sand, for a portion of the mass of grains thus produced to contain not only the fine fraction but also grains having a larger diameter, which are introduced into the granular material together with the fine fraction. Preferably, at least 70 wt. %, more preferably at least 90 wt. %, of the total mass of inorganic grains contained in the granular material consists of the fine fraction. In a yet further improved embodiment, at least 95 wt. % of the inorganic grains contained in the granular material have a diameter <500 μm, preferably <250 μm, yet more preferably a diameter between 2 and 130 μm.

EXAMPLE I

Coarse sand having a grain diameter of 0.5–3 mm was ground to fine sand having a particle diameter of 3–100 μm.

In a stirred vessel, 100 grams of a powder of SMA polymer consisting of 66 mol % of styrene monomer units and 34 mol % of maleic anhydride monomer units and having an intrinsic viscosity of 0.57 dl/g, 0.9 litre of water and 39 grams of potassium hydroxide were stirred at a temperature of 80° C. until the SMA polymer had dissolved and the salt of the SMA polymer had formed.

In a 10 litre vessel, 5 kg of the fine sand was mixed at room temperature over a period of 5 minutes with 1 l of water and 100 g of the salt of the SMA polymer. The mixture thus obtained was then dried in a hot-air oven at 80° C.

The dry mixture was then ground with the aid of a coffee grinder to produce a granular material having a grain diameter of 1–3 mm.

At 23° C., 95 grams of water in a glass beaker having a volume of 250 ml and a diameter of 66 mm were stirred with a cylindrical magnetic stirrer having a length of 40 mm and a diameter of 8 mm at a stirrer speed of 625 revolutions per minute, use being made of a stirrer supplied by Janke and Kunkel from Germany of type ES5. The water was admixed with 5 grams of the granular material. The granular material had completely disintegrated after stirring for 60 sec.

With the aid of a standard procedure, the granular material was blended in a concrete mortar (3 kg of granular material per 50 kg of concrete mortar).

The granular material could be dispersed rapidly and uniformly throughout the concrete mortar in the mixer. Then the granular material disintegrated rapidly, and a homogeneous mortar was obtained which did not contain any agglomerates of the fine sand.

The compression strength was measured by one granule at a time being placed between two parallel planar stainless-steel plates, the plates being moved towards one another in the direction perpendicular to the plates until the granule yielded, by the force which had to be exerted on the plates being measured, this being done for 10 grains having a diameter between 5.6 and 8 mm from the mass of granular material, and the average of the 10 measured forces being calculated. The strength was 76 N.

EXAMPLE II

As in Example I, except that the SMA polymer was replaced by poly(acrylic acid) having a weight average molecular weight of 130,000 kg/kmol. The time required until the granular material disintegrated in water was measured as described in Example I. The time was 120 sec. The strength of the granular material was 80 N.

EXAMPLE III

As in Example I, except that the SMA polymer was replaced by PVA S40 (poly(vinyl acetate)). After grinding, a composition of 95 wt. % of granular material and 5 wt. % of loose fine sand was obtained.

The time required until the granular material disintegrated in water was measured as described in Example I. The time was 20 min. The strength was 53 N.

What is claimed is:

1. A method for preparing a mortar useful in producing a product with improved mechanical properties which comprises a fine filler fraction of inorganic grains having a diameter of less than 500 $\mu$m,
    wherein said inorganic grains are quartz, blast furnace slags, limestone, sand or mixtures thereof,
    wherein the fine filler fraction of inorganic grains is added in the form of a granular material comprising the inorganic grains which, with the aid of a water-soluble polymer, are bound so as to form the granular material, and which granular material readily disintegrates in a water containing composition.

2. A method for preparing a mortar according to claim 1, wherein the inorganic grains comprise at least one member selected from the group consisting of sand and limestone.

3. A method for preparing a mortar according to claim 1, wherein the inorganic grains have a diameter less than 250 $\mu$m.

4. A method for preparing a mortar according to claim 2, wherein the inorganic grains have a diameter less than 250 $\mu$m.

5. A method for preparing a mortar according to claim 1, 2, 3 or 4, wherein the granular material disintegrates within 600 seconds in water of 23° C.

6. A method for preparing a mortar according to claim 1, 2, 3 or 4, wherein the granular material disintegrates within 300 seconds in water of 23° C.

7. A method for preparing a mortar according to claim 1, 2, 3 or 4, wherein the granular material disintegrates after 2 seconds in water of 23° C.

8. A method for preparing a mortar according to claim 1, 2, 3 or 4, wherein the granular material disintegrates after 5 seconds in water of 23° C.

9. A method for preparing a mortar according to claim 1, 2, 3 or 4, wherein the granular material has a strength of at least 30 N.

10. A method for preparing a mortar according to claims 1, 2, 3, or 4, wherein the water-soluble polymer comprises the salt of a polymer comprising monomer units of styrene and of maleic anhydride.

11. A method for preparing a mortar according to claim 10, wherein the sodium salt or potassium salt of the water-soluble polymer is used.

12. A method for preparing a mortar which comprises a fine filler fraction of inorganic grains having a diameter less than 500 $\mu$m,
    wherein said inorganic grains are quartz, blast furnace slags, limestone, sand or mixtures thereof,
    wherein the fine filler fraction of inorganic grains is added in the form of a granular material which comprises the inorganic grains which, with the aid of a water-soluble polymer, are bound so as to form the granular material, and which granular material readily disintegrates in a water containing composition, and
    wherein said inorganic grains comprise silicon oxide or calcium oxide, said method resulting in improved mechanical properties in a product formed from the mortar.

13. A method of preparing a concrete product with improved mechanical properties comprising:
    adding a granular material, that readily disintegrates in water, comprising,
      i) an inorganic filler having a grain diameter of less than 500 $\mu$m; and
      ii) a water-soluble polymer;
    to a mortar composition,
    wherein said inorganic filler is quartz, blast furnace slags, limestone, sand or mixtures thereof.

14. The method of claim 13 wherein said mechanical property is shrinkage.

15. The method of claim 13 wherein said mechanical property is durability.

* * * * *